United States Patent
Soni

(10) Patent No.: US 11,645,839 B2
(45) Date of Patent: *May 9, 2023

(54) LANE FEATURE DETECTION IN AERIAL IMAGES BASED ON ROAD GEOMETRY

(71) Applicant: HERE Global B.V., Eindhoven (NL)

(72) Inventor: Abhilshit Soni, Nadiad (IN)

(73) Assignee: HERE Global B.V., Eindhoven (NL)

( * ) Notice: Subject to any disclaimer, the term of this patent is extended or adjusted under 35 U.S.C. 154(b) by 67 days.

This patent is subject to a terminal disclaimer.

(21) Appl. No.: 17/317,378

(22) Filed: May 11, 2021

(65) Prior Publication Data

US 2021/0264151 A1    Aug. 26, 2021

Related U.S. Application Data

(63) Continuation of application No. 16/222,111, filed on Dec. 17, 2018, now Pat. No. 11,030,457.

(51) Int. Cl.
*G06K 9/00* (2022.01)
*G06V 20/10* (2022.01)
(Continued)

(52) U.S. Cl.
CPC .......... *G06V 20/182* (2022.01); *G01C 21/30* (2013.01); *G01C 21/3602* (2013.01); *G06K 9/6228* (2013.01); *G06K 9/6256* (2013.01); *G06K 9/6261* (2013.01); *G06T 7/60* (2013.01); *G06T 3/60* (2013.01); *G06T 2207/10032* (2013.01); *G06T 2207/30181* (2013.01)

(58) Field of Classification Search
None
See application file for complete search history.

(56) References Cited

U.S. PATENT DOCUMENTS 9,704,068 B2    7/2017    Mnih et al.
9,710,714 B2    7/2017    Chen et al.
(Continued)

FOREIGN PATENT DOCUMENTS

EP    3319048 A1    5/2018
WO    2018104563 A2    6/2018

OTHER PUBLICATIONS

Yang Zheng and Izzat H. Izzat, "Exploring OpenStreetMap Capability for Road Perception", 2018 IEEE Intelligent Vehicles Symposium (IV) Changshu, Suzhou, China, Jun. 26-30, 2018, pp. 1438-1443 (Year: 2018).*

(Continued)

*Primary Examiner* — Atiba O Fitzpatrick
(74) *Attorney, Agent, or Firm* — Lempia Summerfield Katz LLC

(57) ABSTRACT

An apparatus and method for lane feature detection from an image is performed according to predetermined path geometry. An image including at least one path is received. The image may be an aerial image. Map data, corresponding to the at least one path and defining the predetermined path geometry is selected. The image is modified according to the selected map data including the predetermined path geometry. A lane feature prediction model is generated or configured based on the modified image. A subsequent image is provided to the lane feature prediction model for a prediction of at least one lane feature.

19 Claims, 19 Drawing Sheets

(51) Int. Cl.
  *G01C 21/30* (2006.01)
  *G01C 21/36* (2006.01)
  *G06K 9/62* (2022.01)
  *G06T 7/60* (2017.01)
  *G06T 3/60* (2006.01)

(56) References Cited

U.S. PATENT DOCUMENTS

2010/0266161 A1 10/2010 Kmiecik et al.
2013/0343641 A1* 12/2013 Mnih .................. G06T 11/60
                                              382/156
2018/0164812 A1* 6/2018 Oh ..................... G06V 10/82

OTHER PUBLICATIONS

Gaoya Cao, Florian Damerow, Benedict Flade, et al., "Camera to Map Alignment for Accurate Low-Cost Lane-Level Scene Interpretation", 2016 IEEE 19th International Conference on Intelligent Transportation Systems (ITSC) Windsor Oceanico Hotel, Rio de Janeiro, Brazil, Nov. 1-4, 2016, pp. 498-504 (Year: 2016).*
Extended European Search Report from European Patent Application No. 19217117.1, dated Mar. 1, 2022, 7 pages.
Azimi, Seyed Majid, et al. "Aerial LaneNet: Lane Marking Semantic Segmentation in Aerial Imagery using Wavelet-Enhanced Cost-sensitive Symmetric Fully Convolutional Neural Networks." arXiv preprint arXiv: 1803.06904 (2018).
De Paula, Mauricio Braga, and Claudio Rosito Jung. "Real-time detection and classification of road lane markings." Graphics, Patterns and Images (SIBGRAPI), 2013 26th SIBGRAPI-Conference on. IEEE, 2013.
European Search Report for European Patent Application No. 19217117.1-1207 dated Apr. 29, 2020.
Fischler, Martin A., Jay M. Tenenbaum, and Hans Christoph Wolf. "Detection of roads and linear structures in low-resolution aerial imagery using a multisource knowledge integration technique." Readings in Computer Vision. 1987. 741-752.
Gaoya Cao, Florian Damerow, et al., "Camera to Map Alignment for Accurate Low-Cost Lane-Level Scene Interpretation", 2016 IEEE 19th International Conference on Intelligent Transportation Systems (ITSC) Windsor Oceanico Hotel, Rio de Janeiro, Brazil, Nov. 1-4, 2016, pp. 498-504 (Year: 2016).
Kaiser, Pascal, et al. "Learning Aerial Image Segmentation from Online Maps." IEEE Transactions on Geoscience and Remote Sensing 55.11; Jul. 21, 2017. (pp. 1-15).
Saito, Shunta, and Yoshimitsu Aoki. "Building and road detection from large aerial imagery." Image Processing: Machine Vision Applications VIII. vol. 9405 International Society for Optics and Photonics, 2015.
Tournaire, O., and N. Paparoditis. "A geometric stochastic approach based on marked point processes for road mark detection from high resolution aerial images." ISPRS Journal of Photogrammetry and Remote Sensing 64.6 (2009): 621-631.
Van Etten, Adam. "Broad Area Satellite Imagery Semantic Segmentation (BASISS)." Medium.com, Medium, Jan. 24, 2018, medium.com/the-downlinq/broad-area-satellite-imagery-semantic-segmentation-basiss-4a7ea2c8466f.

* cited by examiner

LANE FEATURE DETECTION IN AERIAL IMAGES BASED ON ROAD GEOMETRY

CROSS REFERENCE TO RELATED APPLICATION

This application is a continuation under 37 C.F.R. § 1.53(b) and 35 U.S.C. § 120 of U.S. patent application Ser. No. 16/222,111 filed Dec. 17, 2018 which is hereby incorporated by reference in its entirety.

FIELD

The following disclosure relates to lane feature, and more specifically, to a machine learned model for lane feature detection in aerial images modified based on road geometry.

BACKGROUND

Object detection and image segmentation are important tasks in computer vision for computers to understand the world and make reactions. Neural networks have been demonstrated to be effective for these tasks. Objection detect is applicable to a variety of technological fields including, but not limited to, navigation, driving assistance, and autonomous driving. Neural networks may be designed to analyze certain images in these fields.

The detection of roads in particular may be challenging. In the case of aerial images, a large amount of manually labeled image data is required. Segmenting such a large image may require either a very high computational power including resources such as memory and multiple graphics processing units (GPUs) with additional memory, or it can also be solved by breaking the large image down in small patches of equal size which may or may not cover roads at all. Existing methods often do not detect roads efficiently and effectively.

SUMMARY

In one embodiment, a method for lane feature detection from an image according to predetermined path geometry includes receiving an image including at least one path, selecting map data corresponding to the at least one path, the map data defining the predetermined path geometry, modifying the image according to the selected map data including the predetermined path geometry, generating, using a processor, a lane feature prediction model based on the modified image, and providing a subsequent image to the lane feature prediction model for a prediction of at least one lane feature.

In another embodiment, an apparatus for lane feature detection from an image according to predetermined path geometry includes a road network module, an aerial image editor, and a lane feature module. The road network module configured to identify map data corresponding to at least one path, and the map data defines the predetermined path geometry. The aerial image editor is configured to modify the image according to the map data including the predetermined path geometry. The lane feature module is trained according to the modified image and configured to identify at least one lane feature from a subsequent image.

In another embodiment, a non-transitory computer readable medium including instructions that when executed by a process are configured to perform receiving an aerial image for a geographic area, receiving road network data for the geographic area, modifying the aerial image according to the road network data, and providing the modified aerial image to a lane feature detection model.

BRIEF DESCRIPTION OF THE DRAWINGS

Exemplary embodiments of the present invention are described herein with reference to the following drawings.

DETAILED DESCRIPTION

Figure 1:
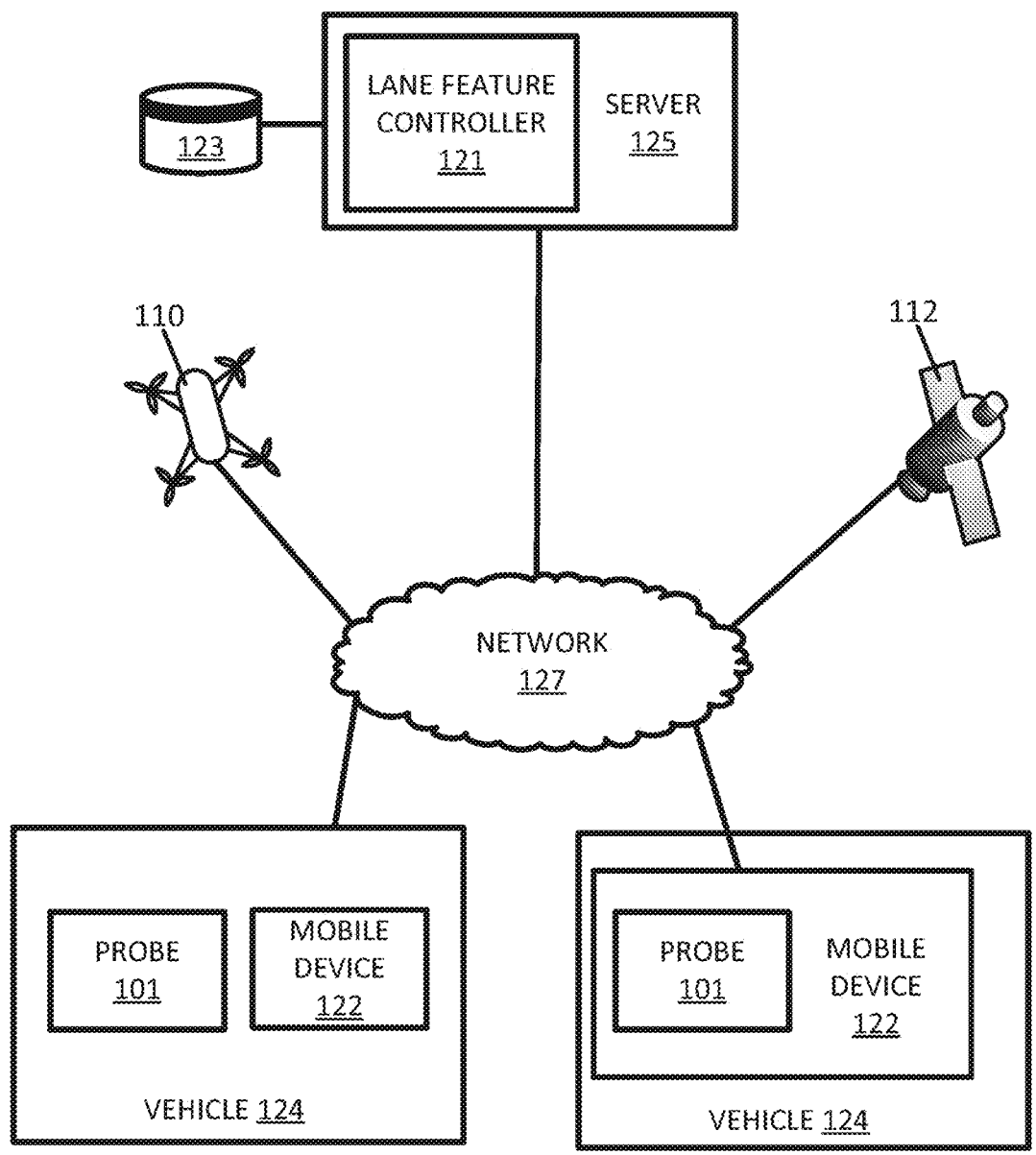
FIG. 1 illustrates an example system for lane feature detection.

Lane features, as defined herein, include symbols or indicia that are associated with a road or path. The lane features may be physical labels on the road. The lane features may be on the surface of the road or path. The lane features may be painted, drawn, or affixed to the road with decals. Example lane features include boundary lines along the side of the road, lane dividers between lanes of the road, and other designations. Other designations may describe one or more functions or restrictions for the road. For example, the lane feature may designate a speed limit for the road, a high occupancy requirement for the road, a type of vehicle such as bicycle or bus, stopline or a crosswalk.

Lane features may be detected in a variety of techniques. Lane features may be detected from camera images that are collected by vehicle. Lane features may be detected by a light detection and ranging (LiDAR) system. In one example, lane features are detected based on the reflectivity or retereoflectivity of the materials or paint for the lane feature.

The following embodiments include the detection of lane features from aerial images. Aerial images may be images not collected in close proximity to the road. The aerial images may be collected by a satellite (e.g., satellite image or high altitude aerial image), collected from airplanes or helicopters (e.g., low altitude aerial image), collected from a drone (e.g., drone image), or collected from a structure.

The detection of lane features from aerial images faces challenges. Certain techniques for the detection of lane features, such as semantic image segmentation using convolutional neural networks are trained on large amount of manually labelled image data. The manual labeling of the image data is inefficient and costly because it requires a human operator or technician. Semantic Image segmentation is the process of assigning a label to every pixel in an image such that pixels with the same label share certain characteristics. Segmentation on a full image of very high resolution sufficient for lane features to be clearly visible on the road, is very difficult to achieve. Lane markings cover a very small amount of area in a very high resolution image, which would require a huge amount of training data to have a reasonable segmentation model. It would also require high amount of resources to process and segment such high resolution images (e.g., an image with dimensions of 5000× 5000 pixels). Segmenting such a large image requires either a very high computational power and resources like memory and multiple GPUs with additional memory, or it can also be solved by breaking the large image down in small patches of equal size, and many of these small patches may not cover any roads at all.

The following embodiments include lane feature detection from aerial images that are modified according to a road network. The road network is matched to the aerial image. The road network may define a mask for editing the aerial image. The mask reduces the portions of the aerial image that is provided to a machine learning model. The machine learning model may be trained on such images, and subsequently, analyze such images based on one or more settings or coefficient defined according to the training. The machine learning model is trained more efficiently and analyzes images more efficiently because of the modified aerial image that includes less image to analyze. Because only patches of road are segmented, instead of segmenting the entire image, the required number of computational resources such as CPU, GPU and memory are reduced. In addition, the patches of road may be rotated to a predetermined rotation, which assists the machine learning model converge more quickly on a solution.

The following embodiments relate to several technological fields including but not limited to navigation, autonomous driving, assisted driving, traffic applications, and other location-based systems. The following embodiments achieve advantages in each of these technologies because an increase in the accuracy of lane feature classifications improves the effectiveness, efficiency, and speed of specific application in these technologies. In each of the technologies of navigation, autonomous driving, assisted driving, traffic applications, and other location-based systems, identifications of lane features in collected images improves the technical performance of the application. In addition, users of navigation, autonomous driving, assisted driving, traffic applications, and other location-based systems are more willing to adopt these systems given the technological advances in lane feature classification.

FIG. 1 illustrates an example system for lane feature detection and classification. In FIG. 1, an aerial vehicle such as drone 110 or satellite 112 for collecting aerial images is connected to a map developer system including a server 125 through a network 127. The server 125 updates geographic database 123 using the aerial image. The vehicles 124 may be directly connected to the server 125 or through an associated mobile device 122. The server 125 and the geographic database 123, exchanges (e.g., receives and sends) data from the vehicles 124 that has been updated in response to the aerial images. Additional, different, or fewer components may be included.

The aerial vehicle, which may include any number of drones 110 or satellites 111 may collect the aerial images with an image sensor. The image sensor may include a camera, a charge coupled device (CCD). Light from Earth may be guided through a barrel shaped object and steered or focused using one or more mirrors onto the image sensor. The camera may include a configuration with one or more settings designed for collected images at a far distance such as 1,000 to 20,000 miles above the surface of the Earth.

The aerial vehicle may store the aerial images, which are later downloaded to the server 125. Alternatively, the aerial images may be transmitted from the aerial vehicle to the server 125 through the network 127. The network 127 may include one or more wireless transmission channels that carry wireless signals from the aerial vehicle to the server 125. The wireless signal may be encoded with values for the aerial images.

The server 125, through a lane feature controller 121, may analyze the aerial images to determine one or more lane features in the aerial image. The server 125 may modify an aerial image according to a road network that is accessed from the geographic database 123. The aerial image may be reduced to remove portions of the aerial image that do not include roadways. The server 125 may utilize the reduced aerial image for training a learned model or a set of models. Additional images may be analyzed using the trained learned model to identify lane features in the additional images. The modification and analysis of the aerial images is discussed further below.

The lane features may be stored in the geographic database 123 and provided to mapping applications, navigational applications, or driving applications. The mapping application may indicate one or more map items in response to the lane features. The map items may include a direction indication for a road, a lane divider designation, or a road boundary. The navigation application may generate a route according to the lane feature. The driving application may provide a warning or driving command in response to the lane feature.

The mobile device 122 may include mapping applications, navigational applications, or driving applications. The mobile devices 122 may include local databases corresponding to a local map, which may be modified by to the server 125 using the geographic database 123. The local map may include a subset of the geographic database 123 and is updated or changed as the vehicles 124 travel. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the geographic database 123.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

Each image or point cloud may be associated with or stored with a timestamp and/or a location stamp based on the time and location that the image was collected. In another example, the images may be collected in response to time intervals (e.g., every 0.5 second, every second) as the vehicle travels along the roadway such that the series of images are at a predetermined time interval. In this example, the geographic distance between images varies as the speed of the camera or collection vehicle changes. The timestamp may be omitted when the images are collected at the predetermined time interval. In another example, the images may be collected in response to location intervals (e.g., every meter, every 10 feet) as the vehicle travels along the roadway such that the series of images are at a predetermined location interval. In this example, the time between images varies as the speed of the camera or the collection vehicle changes. The location stamp may be omitted when the images are collected at the predetermined location interval.

The probe data forming the location stamp may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
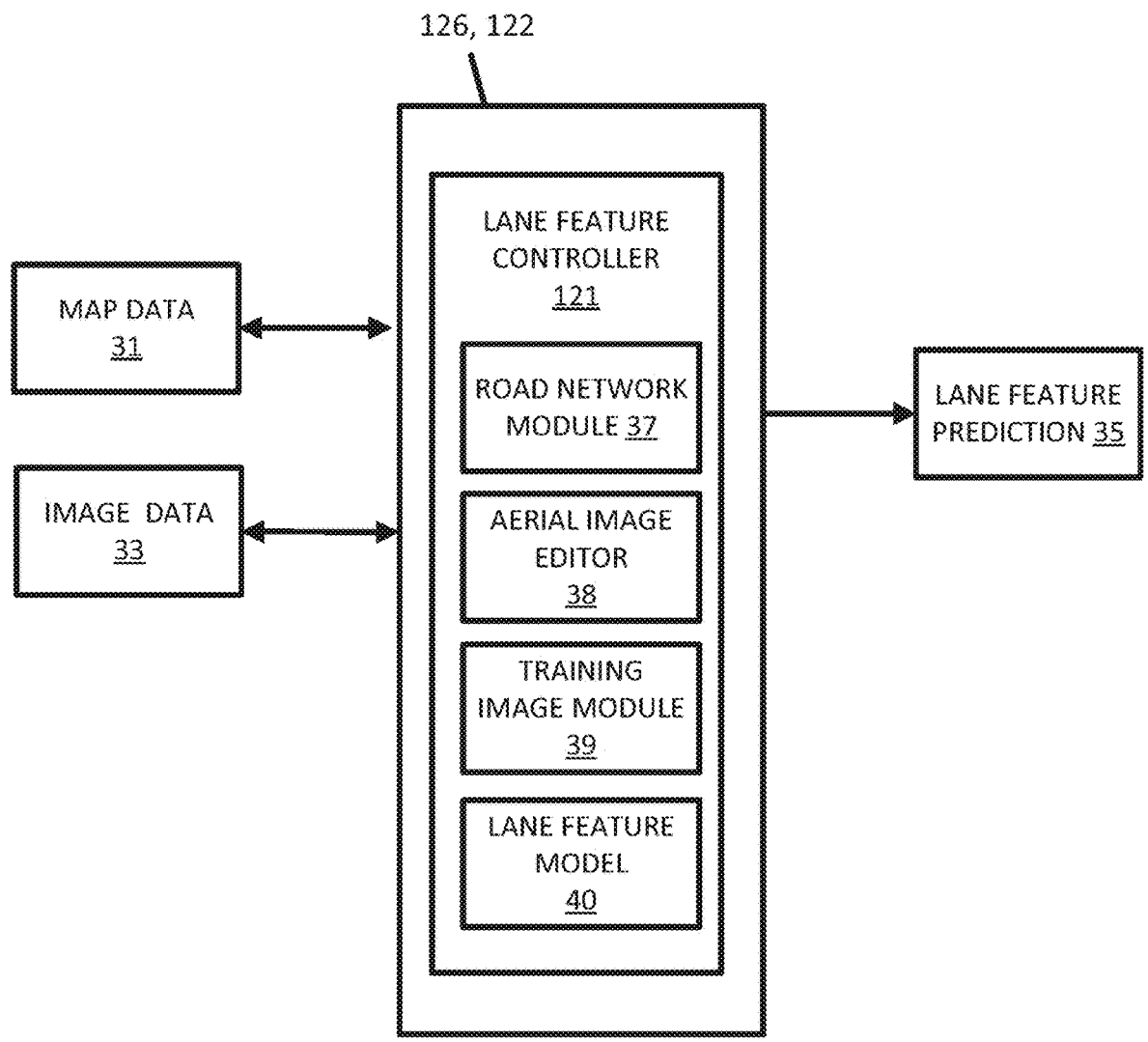
FIG. 2 illustrates an example framework for the lane feature controller of the system of FIG. 1.

FIG. 2 illustrates an example lane feature controller 121 for the lane feature detection and classification. The lane feature controller 121 includes any combination of a road network module 37, an aerial image editor 38, a training image module 39, and a lane feature model or module 40. Additional, different, or fewer components may be included.

The lane feature controller 121 receives map data 31 from the geographic database 123. The map data 31 may define a road network. The map data 31 may include road segments. The road segments may be indexed according to geographic coordinates. A road segment may be defined by two geographic coordinates, an origin geographic coordinate and an ending geographic coordinate. The road segment may be defined by a single geographic coordinate and a direction and/or distance for the road segment.

The lane feature controller 121 receives image data 33 (e.g., aerial image data) collected by the aerial vehicle. The image data 33 may include pixel values such as color values, brightness values, luminance values, or hue values that represent the pixels in the image. The pixel values may represent roads, buildings, vegetations, bodies of water, or other features in the image. The image data 33 may also be associated with geographic coordinates. For example, one or more corners of an image in the image data 33 may be assigned geographic coordinates, which describes the geographic area depicted in the image.

The lane feature controller 121 may identify a scaling factor for the relationship between the image data 33 and the geographic coordinates. The scaling factor converts from the dimensions of a pixel in the image data 33 to geographic dimensions in the map data 31. The scaling factor may describe the number of pixels that correspond to a geographic distance. The distance may be measured in degrees (minutes, seconds) of latitude or longitude or be an absolute distance such as meters or miles.

The map data 31 may be tied to the image data 33 according the geographic area for the map data 31 and the geographic area for the image data 33. In other words, the lane feature controller 121 may determine a relationship between a road network of the map data 31 and an aerial image in the image data 33. A bounding box defining the aerial image, for example, may be defined by latitude and longitude values for the top right and the bottom left corners. The aerial image may be georeferenced by a library (e.g., Geospatial Data Abstraction Library) in order to read a format of image data with georeferenced information. The image data 33 may be stored as a geoTIFF including geographic projections or another format of image. The geoTIFF may include data for map projections, coordinate systems, ellipsoids, or other data necessary to establish the exact spatial reference for the file with respect to the geographic coordinate system.

The lane feature controller 121 may calculate the relationship between a road network of the map data 31 and an aerial image in the image data 33 using the scaling factor. For example, the width of a road in the road network has a geographic distance, which is converted to a number of pixels in the image data 33 using the scaling factor.

The road network module 37 is configured to identify map data 31 corresponding to at least one path. The map data 31 may define the predetermined path geometry. In some examples, the map data 31 includes road attribute data for road segments, or path attribute data for path segments, that may include one or more dimensions. The attribute may include a width value that describes the width of the road. Example widths may include 2.5 meters and 3.7 meters. The predetermined path geometry may be calculated according to the width value. That is, the predetermined path geometry may include a width equal to the width value.

The attribute may include a functional classification value that describes the functional classification of the road. The functional classification value may indicate an arterial rode, a collector road, or a local road. Different widths may be applied to the different classifications of road. The predetermined path geometry may be calculated according to the functional classification value. That is, the predetermined path geometry may include a width defined by the functional classification value.

The attribute may include a lane quantity value that describe the number of lanes of the road. The width of the road may be calculated from the number of lanes of the road. The predetermined path geometry may be calculated according to the lane quantity value. That is, the predetermined path geometry may include a width defined by the lane quantity value.

The road network module 37 may calculate the predetermined path geometry based on a predetermined distance. The road network module 37 may access the predetermined distance as set by user input. The road network module 37 may access a centerline or a path boundary for at least one path from the map data 31. The road network module 37 calculates the predetermined path geometry based on a predetermined distance to the centerline or path boundary. The predetermined distance may be selected based on the number of lanes, the functional classification, or other attribute of the road.

The lane feature controller 121 may calculate the width value based on probe data. Traces or series of probe data collected at probes 101 may be analyzed to determine the width value. The probe data may be clustered and the width of the cluster is approximated as the width value. For example, the road network module 37 may calculate the predetermined path geometry based on traces from the GNSS system or other traffic data. The traces may be sets of data collected from vehicles as they traverse the road network. Because vehicles travel in different lanes or different parts of the lanes, a set of traffic data has a distribution of the traces across the lane. The road network module 37 may calculate a width for the road based on the distribution. The road network module 37 may calculate the width of the road based on a predetermined number (e.g., 1.5) standard deviations, or variance, in the distribution. The road network module 37 may calculate an outlier elimination based on the number of standard deviations in order to calculate the width for the predetermined path geometry.

The lane feature controller 121 may perform an image processing algorithm on the image including the at least one path. The road network module 37 may calculate the predetermined path geometry based on pixel values in the image data 33. The road network module 37 may access a centerline or a path boundary for at least one path from the map data 31 and determine pixel values at or near the centerline. The road network module 37 may compare the pixel values for the centerline to surrounding values to determine the extent of the texture, color, or other image properties of the road, which indicates the width of the road. The road network module 37 may perform template matching or another image processing technique to analyze the road in the image data 33 that is identified from the location of the road network in the map data 31. The image processing algorithm may include segmentation of a road surface or filtering of pixel values for a centerline for the at least one path, and the width value is derived from an output of the image processing algorithm.

The road network module 37 may calculate the predetermined path geometry by constructing a polygon from the centerline and the calculated width of the road. The road network module 37 may convert the centerline coordinates into pixels using the scaling factor. The calculated width, converted to pixels, is divided by two (or another value depending on the number of lanes and other road attributes from the map data 31), and the result is added to the centerline coordinates. This forms the boundary of a polygon that represents a patch of the road.

The aerial image editor 38 configured to modify the image according to the selected map data including the predetermined path geometry. As described above, both the map data 31 and the image data 33 are tied to geographic coordinates. This allows the map data 31 and the image data 33 to be aligned with one another. Through alignment, pixels or image locations in the aerial image of the image data 33 correspond to the map data 31, and specifically the road network included in the map data 31. As a result one or more road segments in the map data 31 are assigned to pixels in the aerial image such that the lane feature controller 121 identifies portions in the image data 33 that correspond to the road network of the map data 31.

Figure 3:
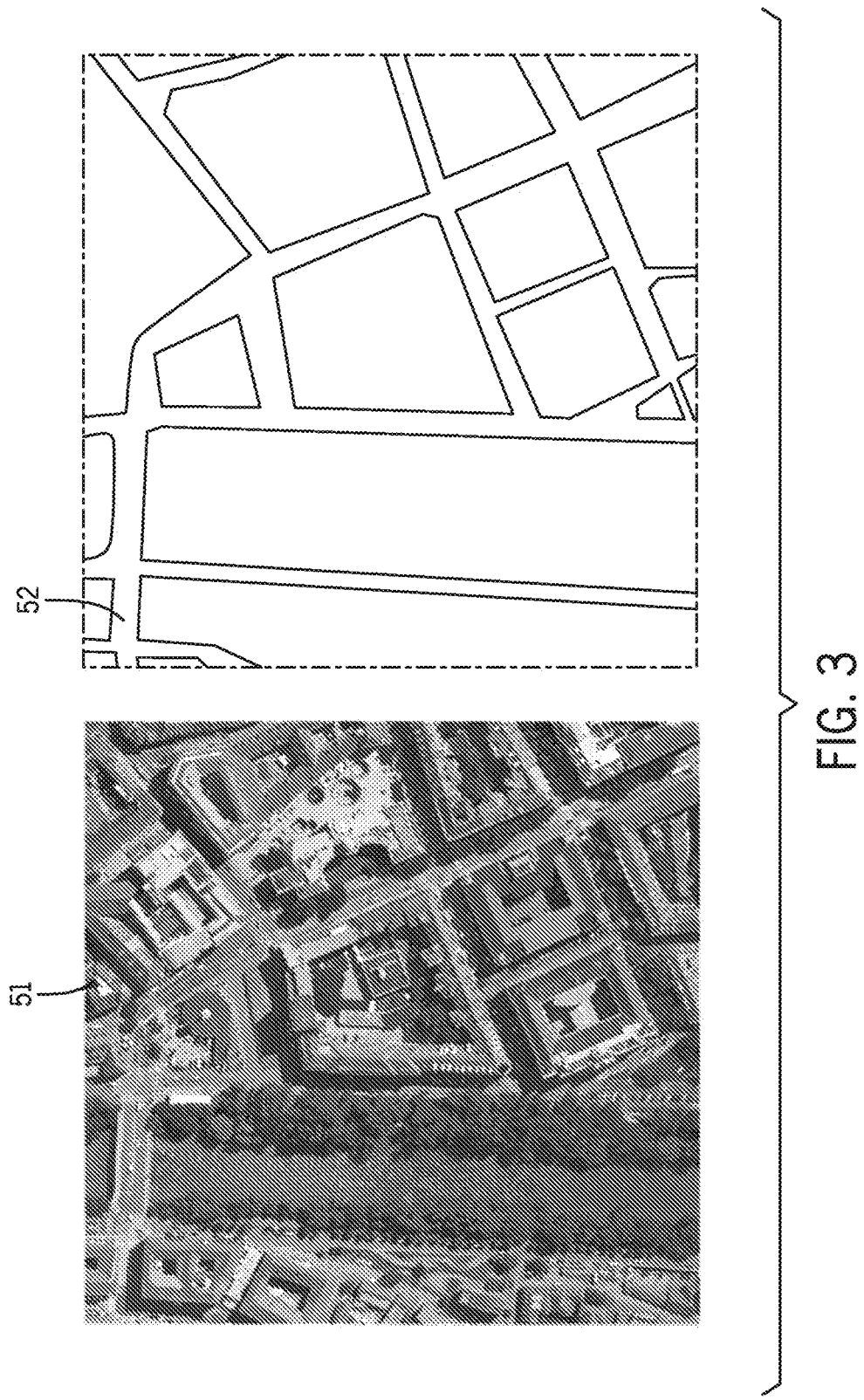
FIG. 3 illustrates an example aerial image and ground truth mask.

The aerial image editor 38 generates a ground truth mask including the predetermined path geometry. FIG. 3 illustrates an example aerial image 51 and ground truth mask 52. The ground truth mask 52 may include a set number of pixel values or mask values. One of the pixel values may indicate a portion of the image that corresponds to the road network. Another of the pixel may indicate a portion of the image that does not correspond to the road network. In one example, the ground truth mask 52 is a binary mask with 1s or high values for the portions that correspond to the road network and 0s or low values for the portions that do not correspond to the road network.

Figure 4:
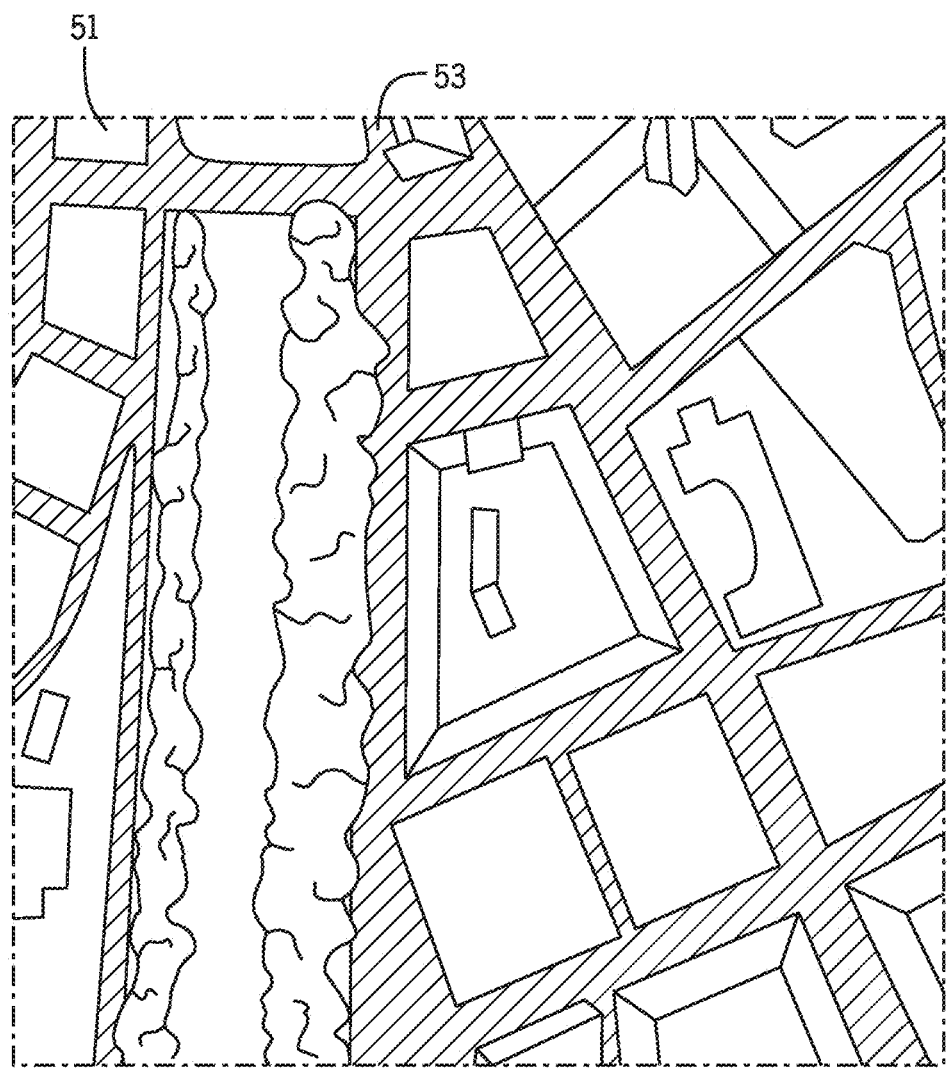
FIG. 4 illustrates the aerial image with road surface highlighted.
Figure 5:
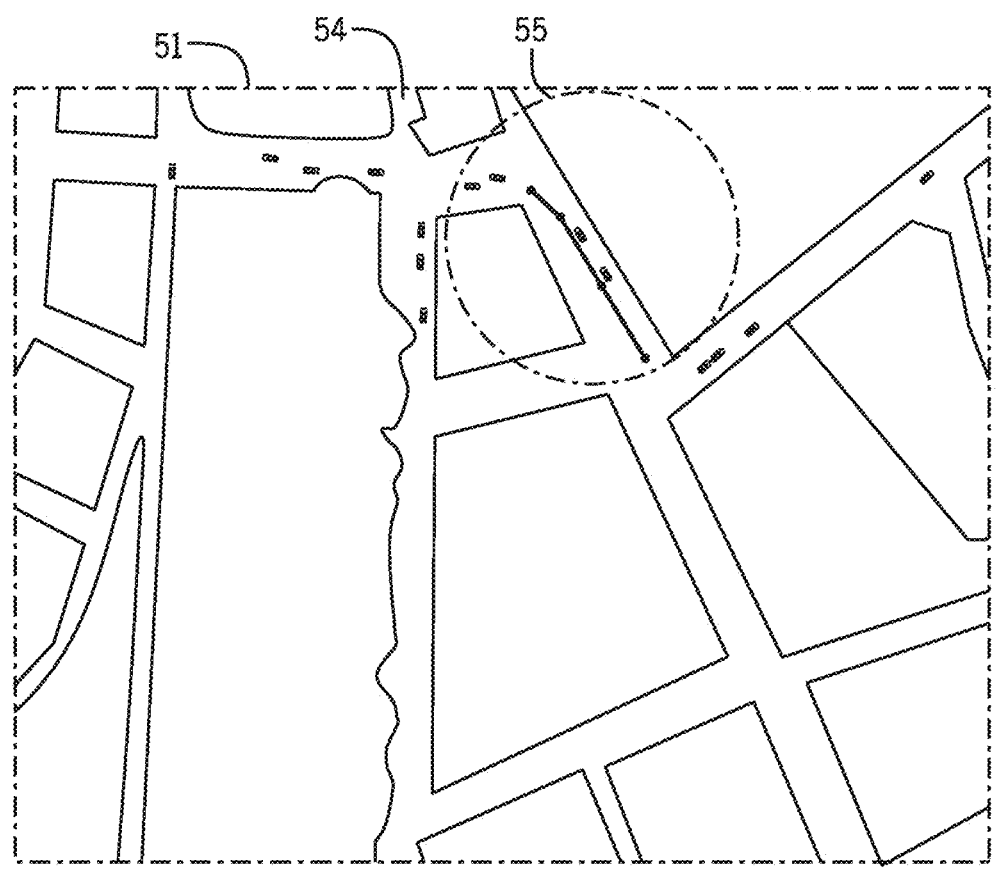
FIG. 5 illustrates a modified aerial image masked except for the road surface.

FIG. 4 illustrates the highlighted road surface in the image after calculating the road width]. The aerial image editor 38 may modify or discard portions of the aerial image 51 by applying a filter on highlighted road surface obtained by adding the calculated road width/2 on each side of road centerline geometry plotted on the aerial image 51. FIG. 5 illustrates a modified aerial image 51 that includes only the road network 54 because the rest of the aerial image 51 has been removed.

The training image module 39 define training images for training the lane feature model 40. The lane feature model 40 may include a neural network. The neural network may have multiple stages each having multiple coefficient defined according to the training process. Subsequently, additional images are analyzed by the lane feature model 40, as discussed in more detail below.

The training image module 39 identifies training images from the aerial image. The training images are selected from the portions of the aerial image that are remaining after the aerial image is modified by the removing parts of the aerial images except the road surface and may be some area around the road surface. The training images may be arranged in a direction of road or path. In other examples, the training images may be spaced apart along the road or path.

The ground truth mask may include pixels of a first value for the predetermined path geometry and pixels of a second value for modified portions of the image. The training image module 39 is configured to divide the modified aerial image into a set of training images. The training images may have a predetermined size, or a patch size, that defines one or more dimensions of the training images. The training image module 39 defines one or more coefficients or other parameters for the lane feature model 40 (e.g., neural network) in response to the training images.

The lane feature model 40 is trained according to the modified image and configured to identify at least one lane feature from a subsequent image (e.g., a to-be-analyzed image). The subsequent image may be an aerial image that is analyzed by the lane feature model or set of models 40 in response to the training. The subsequent image may be an entire aerial image, including topographical features, objects, and the roadway. Alternatively, the subsequent image may be edited according to the road network from the map data 31 in a similar manner to that described above with respect to the training images. In other words, the aerial image of the subsequent image may be compared to the map data 31 or aligned to the map data 31 according to the geographic coordinates.

Figure 6:
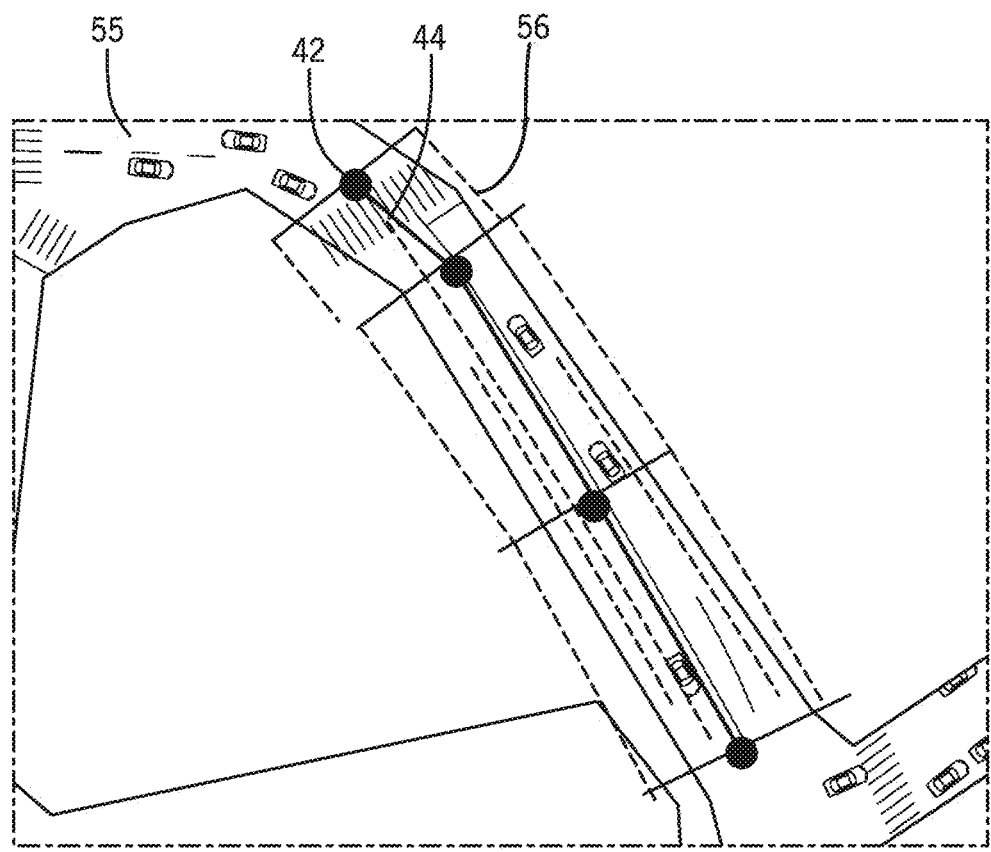
FIG. 6 illustrates an example of road geometry plotted on the modified aerial image.

FIG. 5 highlights a section 55 of the road geometry in the modified aerial image 51 that is illustrated in more detail in FIG. 6. The road section 55 is example of the predetermined path geometry determined from any of the techniques described above. The predetermined path geometry may be defined according to lane boundaries 56 that are spaced by the calculated width from a center line 44. The predetermined path geometry may be defined differently for each section of roadway as demarcated between shape points 42. The shape points 42 may be determined based on the turns in the road. When a road turns more than a set angle, or has more than a predetermined curvature, a new shape point 42 is added to define a new road section. Three road sections are illustrated in FIG. 6.

Figure 7:
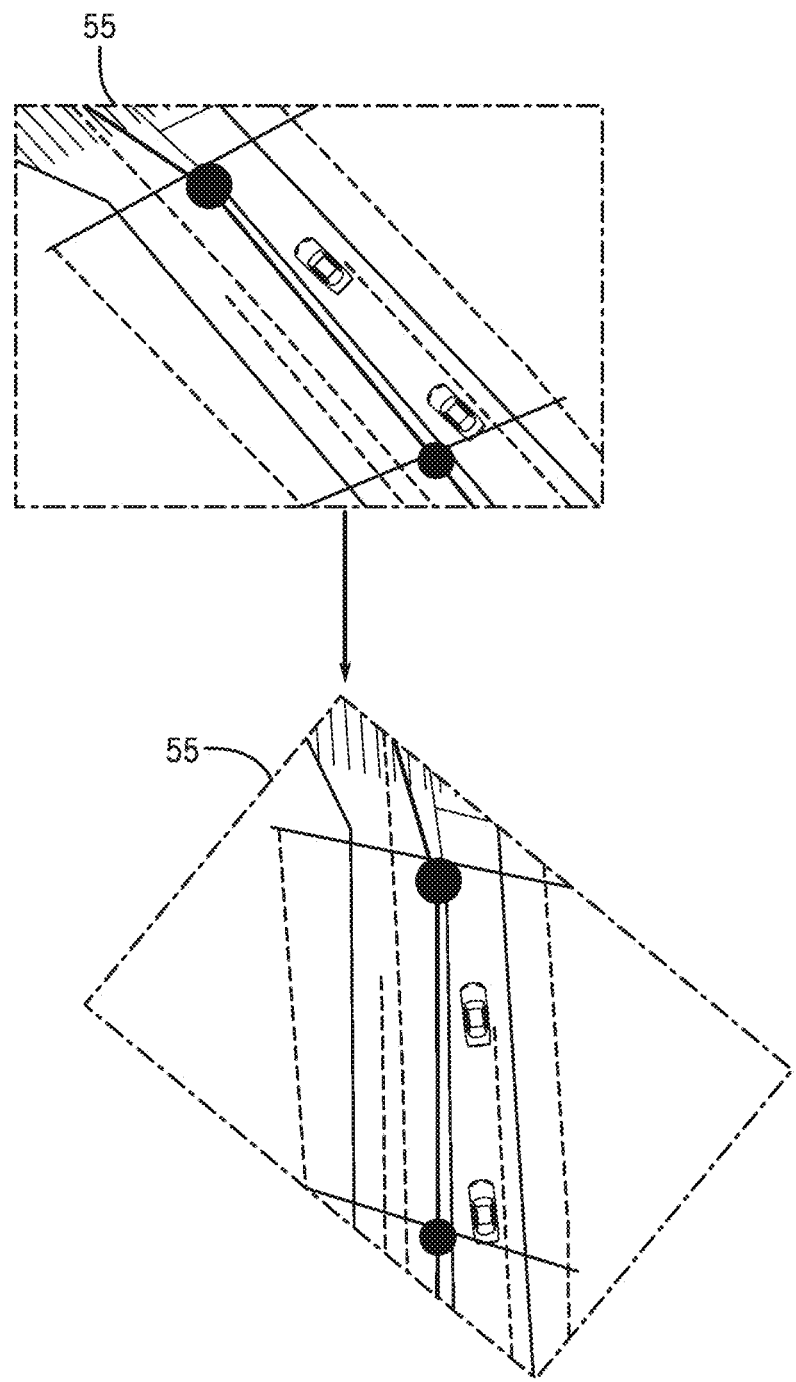
FIG. 7 illustrates an example rotation of the road geometry.

FIG. 7 illustrates an example rotation of the road geometry in the section 55. In one embodiment, the training image module 39 rotates the training images before training the lane feature model 40. The lane feature controller 121 may calculate an angle for the roadway in the training image. The training image module 39 may analyze the image for the direction of the roadway by identifying one or more lines of the roadway. In one alternative, the direction of the roadway may be determined from the road network in the map data 31. The training image module 39 compares the angle of the roadway to a reference. The reference may be a line or plane in a predetermined orientation such as a horizontal line or a vertical line.

In one example, for each rectangular section of the road or predetermined path geometry, the lane feature controller 121 rotates the image up to certain number of degrees until the segment of road centerline geometry within that patch becomes parallel to Y-axis of the image coordinate space. Rotating the image and extracting patches this way will ensure that the machine learning model used for image segmentation is trained on and analyzes only similar type of images where the road and the lane markings are vertically oriented and are parallel to Y-axis of the image. In another embodiment, the feature controller 121 rotates the image to become parallel with the X-axis (or another reference line) of the image coordinate space. With the variations of images on which the model is trained is reduced, training the model converges faster, and operation of the model on subsequent images operates more quickly. Also, because the model is trained on small patches of road instead of the entire aerial image, the speed of training and the computational resources required for training a model on such images is reduced.

The output of the lane feature model 40 includes lane feature predictions 35. In one example, the lane feature model 40 outputs pixel values that form the shapes of the lane features. In one example, the lane feature model 40 outputs a code that corresponds to different types of lane features. One code may correspond to a solid line, another code may correspond to a dashed line, and another code may correspond to a geometric shape of the lane feature. In another example, the lane feature model 40 outputs the geometry and characteristics of the corresponding roadway. The geometry may include the width of the roadway, number of lanes of the roadway, and/or width of the lanes of the roadway. The characteristics of the roadway may include shape, curvature, and length.

In some example, portions or all of the classification process may be performed by another classifier such as a random forest, a decision tree, or another model. The classifier may classify a pixel by examining the pixels surrounding the classified pixel (e.g., a patch). The classifier may classify a pixel by examining the whole image or a portion of the image. For example, the CNN may be trained to identify pixels according to inputs from the whole image or portions of the image.

Figure 8:
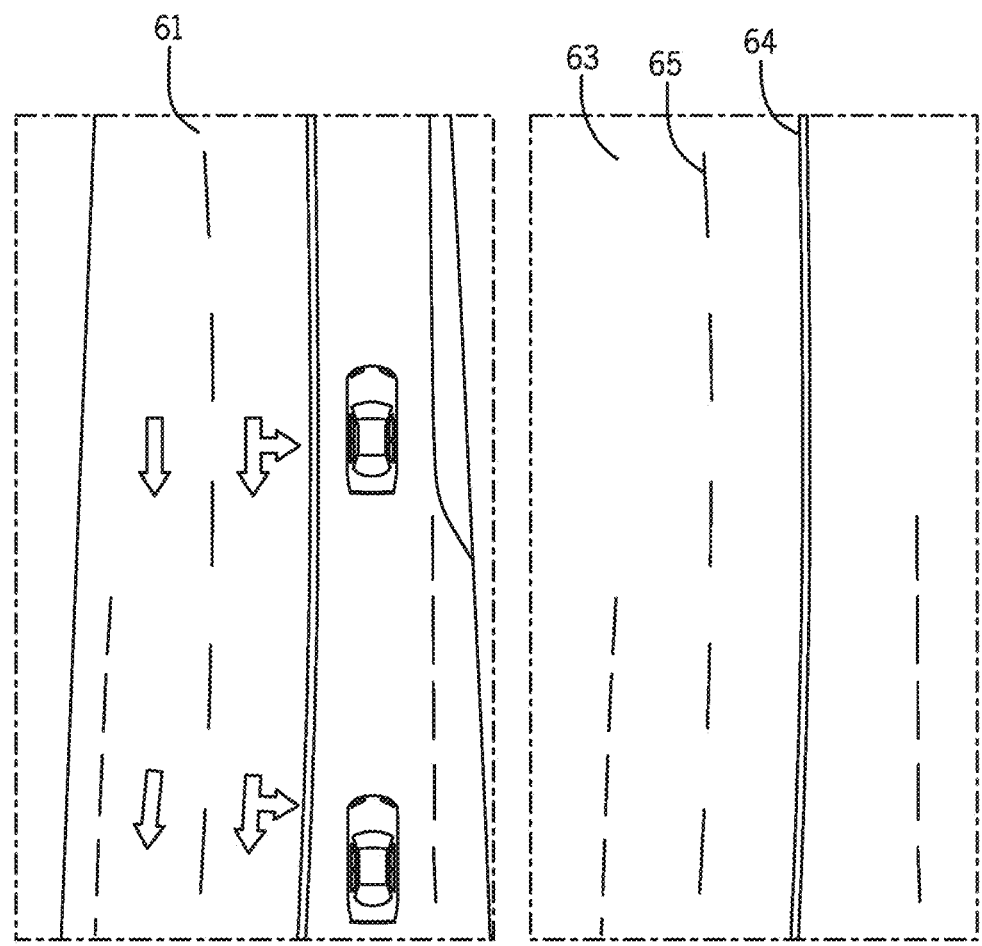
FIG. 8 illustrates an example image patch and ground truth mask or result of the lane feature detection.

FIG. 8 illustrates an example image patch 61 and example lane feature set 63. The image patch 61 may be a training image and the lane feature set 63 may be a ground truth mask for training the lane detection model 40. Alternatively, the image patch 61 may be a subsequently collected image and the lane feature set 83 may be the output of the lane detection model 40. The lane feature set includes 63 includes at least one solid line 64 and at least one dotted line 65.

The lane feature controller 121 may be configured to resize the image path 61 or other training images. The lane feature controller 121 may set one or more dimension for the lane feature model 40. The dimensions may be N×M pixels. To train this network of N×M pixels, the lane feature controller 121 may create the image patches 61 and corresponding ground truth masks (lane feature set 63) of N×M pixels from the extracted patches of road. If the extracted patch size is smaller than N×M, then the lane feature controller 121 may increase the size by padding pixels (e.g., black pixels) around the image patches 61. If the extracted patch is of greater size than N×M, then the lane feature controller 121 may crop the image so that X images of N×M sizes are obtained. If one of the crops is of smaller size, the lane feature controller 121 may match this size by adding the padding pixels around the cropped size. In one example, the value of N×M is 500×1000 pixels.

In FIG. 8, the image patch 61 and ground truth mask (lane feature set 63) may to be padded with black pixels around since the actual size of this patch is 496×904. So, a black strip of 4 pixels is added to the width of both the image patch 61 and the corresponding ground truth so that the width matches 4+496=500 pixels. Also, a strip of 96 black pixels may be added to the height of both the patch and the ground truth so that it matches 904+96=1000 pixels. Once this is done, a semantic segmentation model such as lane feature detection model 40 may be trained using such input patches of road and its corresponding ground truth masks of N×M size so that given such a patch of road of size N×M as an input it is able to do a semantic segmentation and provide classification label value for each pixel indicating whether a pixel is part of lane marking on road or not. The labels for each pixel may be analyzed to locate where the lane markings are detected in the patch of road and map it back to actual georeferenced image to convert the detected lane marking pixel values into actual real world coordinates (latitude/longitude) values.

Figure 9:
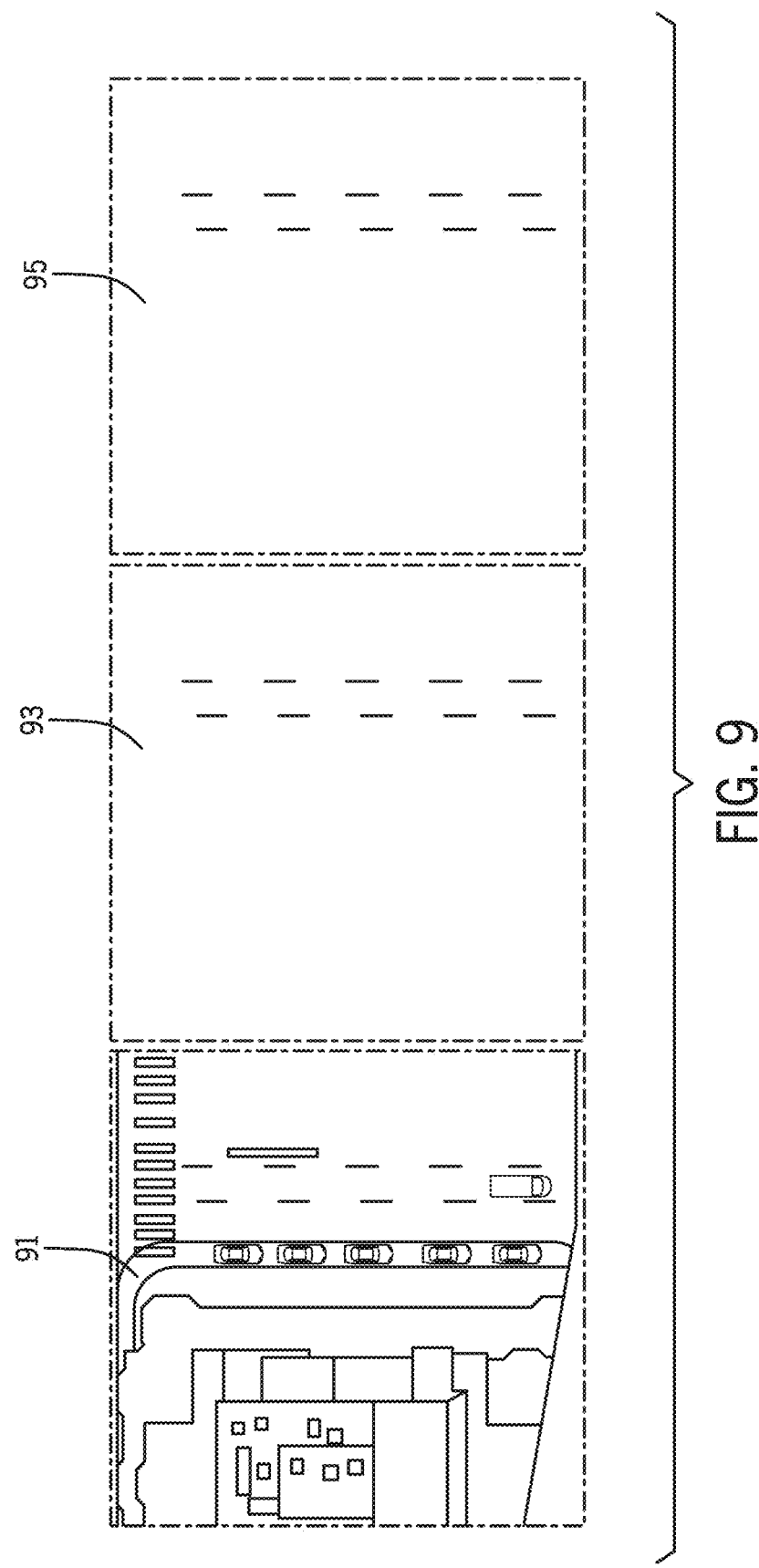
FIG. 9 illustrates an example of an image patch, the corresponding ground truth match, and a prediction from the lane detection.
Figure 10:
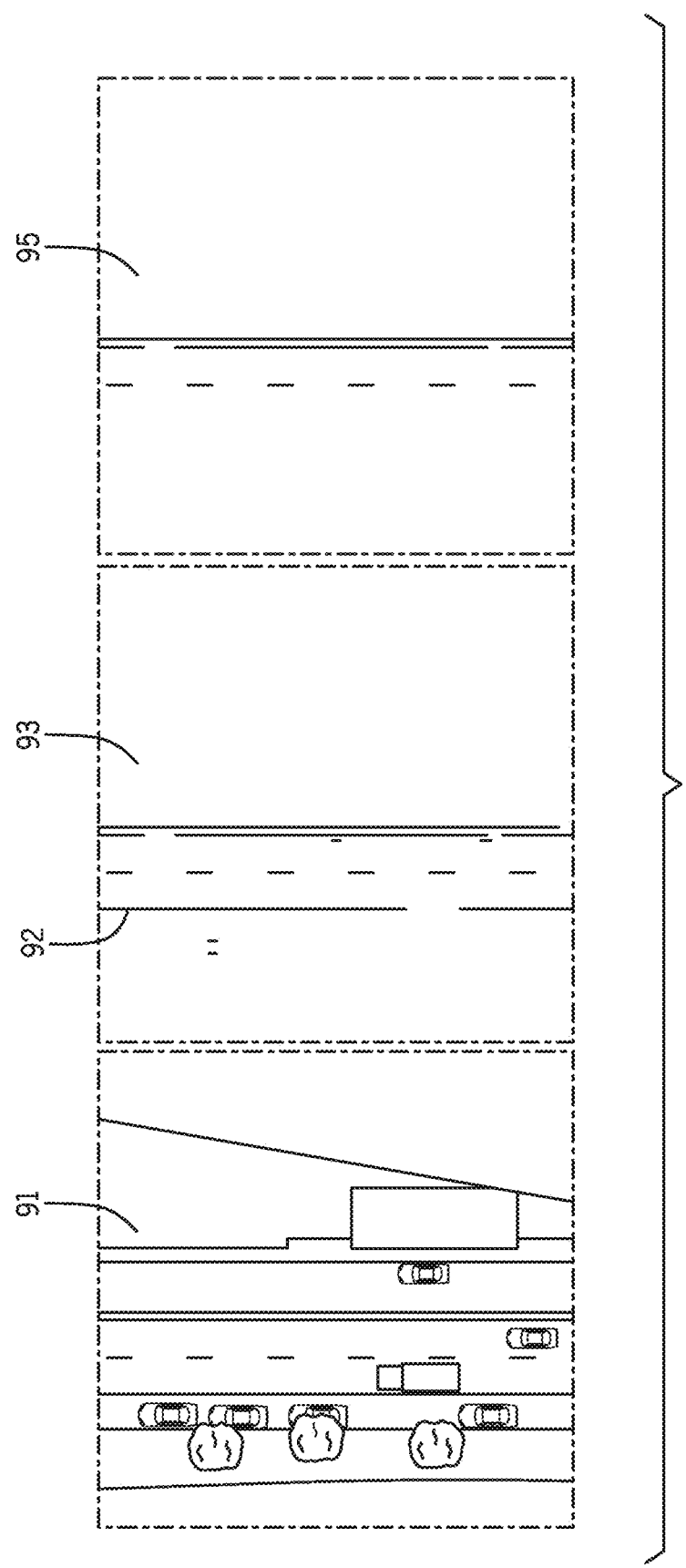
FIG. 10 illustrates another example of an image patch, the corresponding ground truth match, and a prediction from the lane detection.
Figure 11:
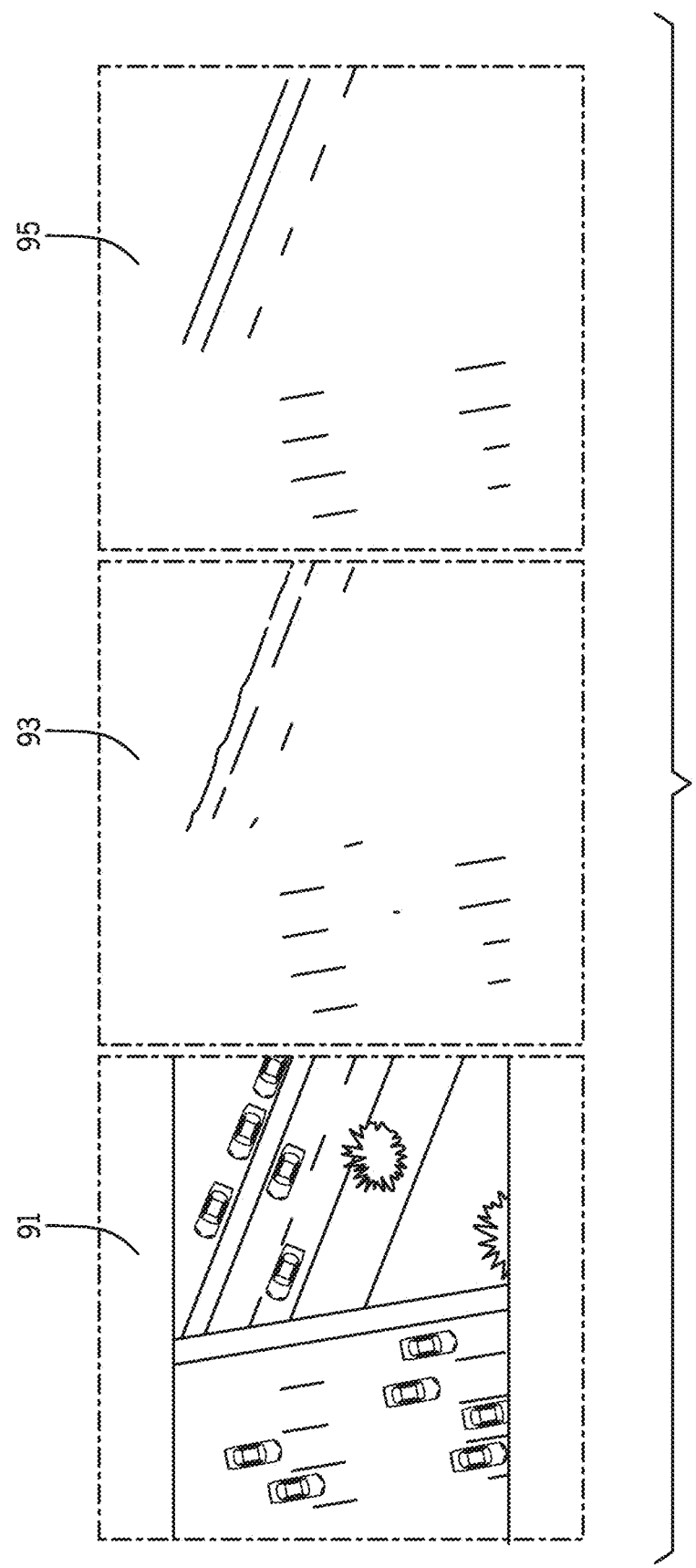
FIG. 11 illustrates another example of an image patch, the corresponding ground truth match, and a prediction from the lane detection.

FIGS. 9, 10, and 11 illustrate example sets of image patches 91, ground truth masks 93, and lane feature predictions 95 to illustrate example outputs of the lane feature model 40. In FIG. 9 the ground truth mask 93 is an exact match to the lane feature prediction 95. FIG. 10 includes a discrepancy. A line 92 that is manually identified in the ground truth mask 93 was not included in the lane feature predictions 95 output of the lane feature model 40. Similarly, complex situations such as the acute angle intersection of FIG. 11 may be more readily detected by the lane feature model 40 that by manual inspection. Certain lane features in FIG. 11 are not easily visible to the human observer because of shadows and obstructions. However, the lane feature predictions 95 output of the lane feature model 40 includes a complete set of lane features to describe the intersection roadways.

Figure 12:
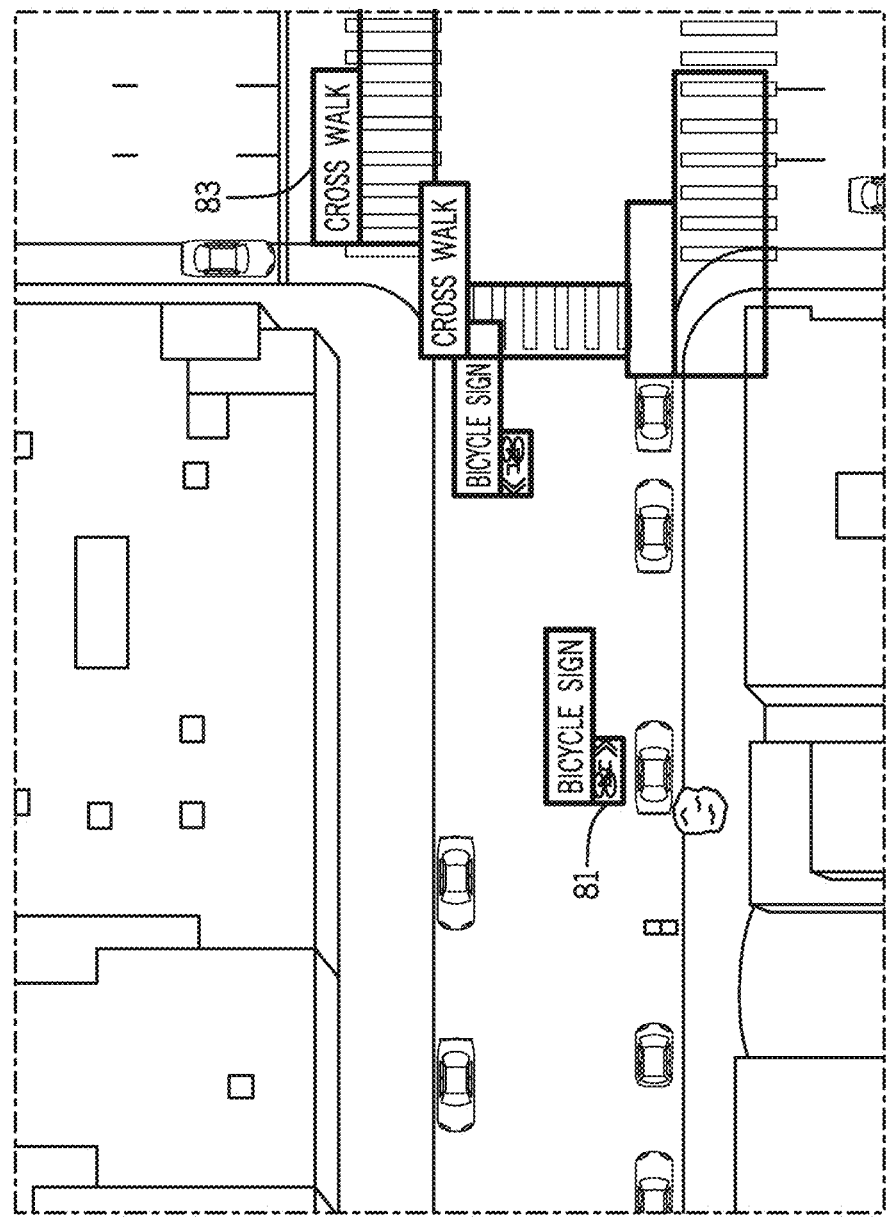
FIG. 12 illustrates an example of other lane features.

FIG. 12 illustrates an example of additional types of lane features. The additional lane features may include a bicycle sign 81 and a cross walk 83. When the lane feature model 40 identifies these features, the lane feature controller 121 may update the geographic database 123 in response to the lane features. For example, the lane feature controller 121 may determine an attribute for the road segment in response to the detected lane feature. The attribute may include a vehicle designation such as bicycle route in response to the bicycle sign 81. Other attributes that may be detected from lane features include speed limits, directions of travel, turn lane designations or other features.

In another example, the lane feature controller 121 may determine an intersection of the road segment with another path. In one example, the lane feature controller 121 identifies a pedestrian path in response to the detection of the cross walk 83. The lane feature controller 121 may create a node in the geographic database 123 in response to this detection. A pedestrian path may be stored in the geographic database 123 in response to this detection.

Figure 13:
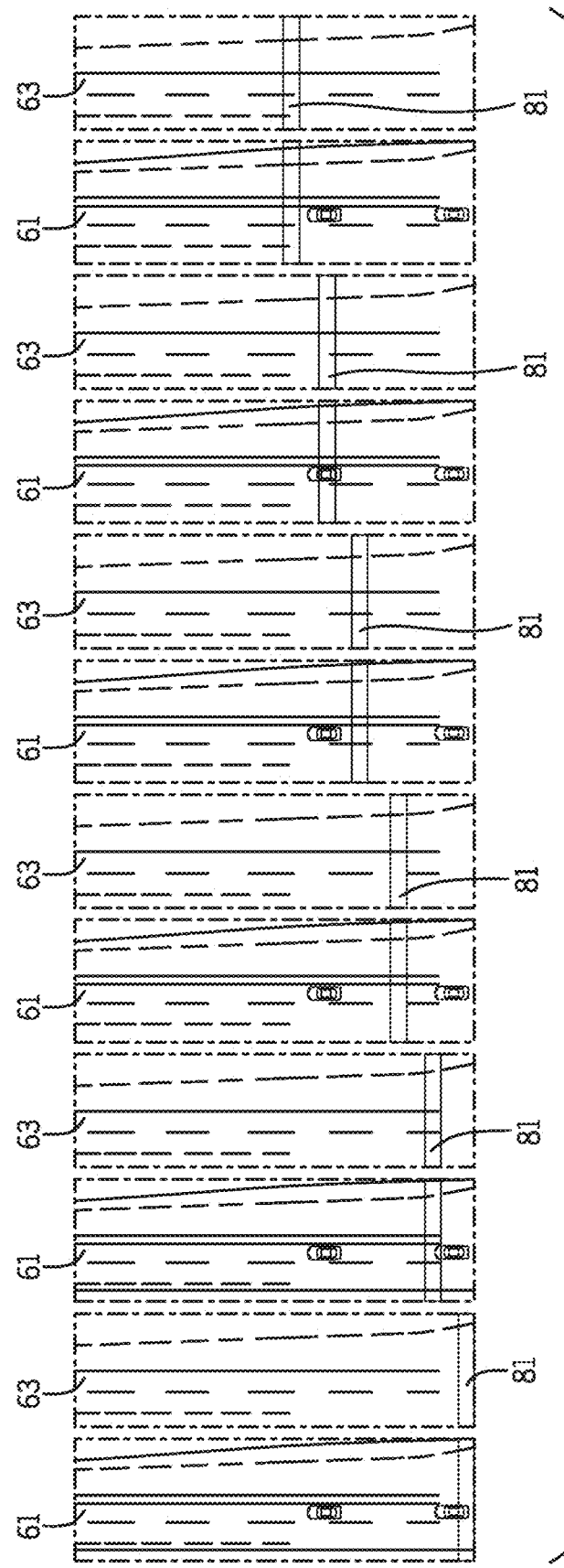
FIG. 13 illustrates an example sliding section technique for lane feature detection.

FIG. 13 illustrates a sliding section technique. In FIG. 13, a sliding window 81 is moved across the image patch 61. Rather than define entire sections of roadway, the predetermined path geometry for training the lane detection model 40 is limited to the sliding window 81. The sliding section approach improves the speed of training the lane detection model 40 because a smaller portion of the image patch 61 is analyzed. Likewise, the lane detection model 40, after training, may be applied to the sliding window 81 to analyze portion of subsequent images. The sliding window 81 is moved between positions to skip X pixels in between while scanning the extracted image patch 61 from either top down or bottom up. The sliding window 81 of N×M pixels is either slid top-down or bottom-up by skipping X number of pixels in between and the lane detection model 40 is trained on the dataset collected by selecting such sections and its corresponding ground truth masks. In the example where the images are rotated such that the road segments are parallel to the X-axis, the sliding window 81 may be moved left to right or right to left.

When the lane detection model 40 is trained on such N×M sections of road patch would be much more robust because it is exposed to a very limited set of features present in the sliding window 81. The advantage is that if all K number of sections in a patch of road has a lane line detected at the same distance on X and Y axis the lane detection model 40 may determine whether a lane is dashed or solid by identifying the existence of gaps across the outputs of multiple sections of a road patch. The sliding section technique improves the training process by limiting details of the road patch instead of exposing the model to a larger part of road patch. The sliding section technique may improve the accuracy for determining whether the lane feature is solid or dashed.

Figure 14:
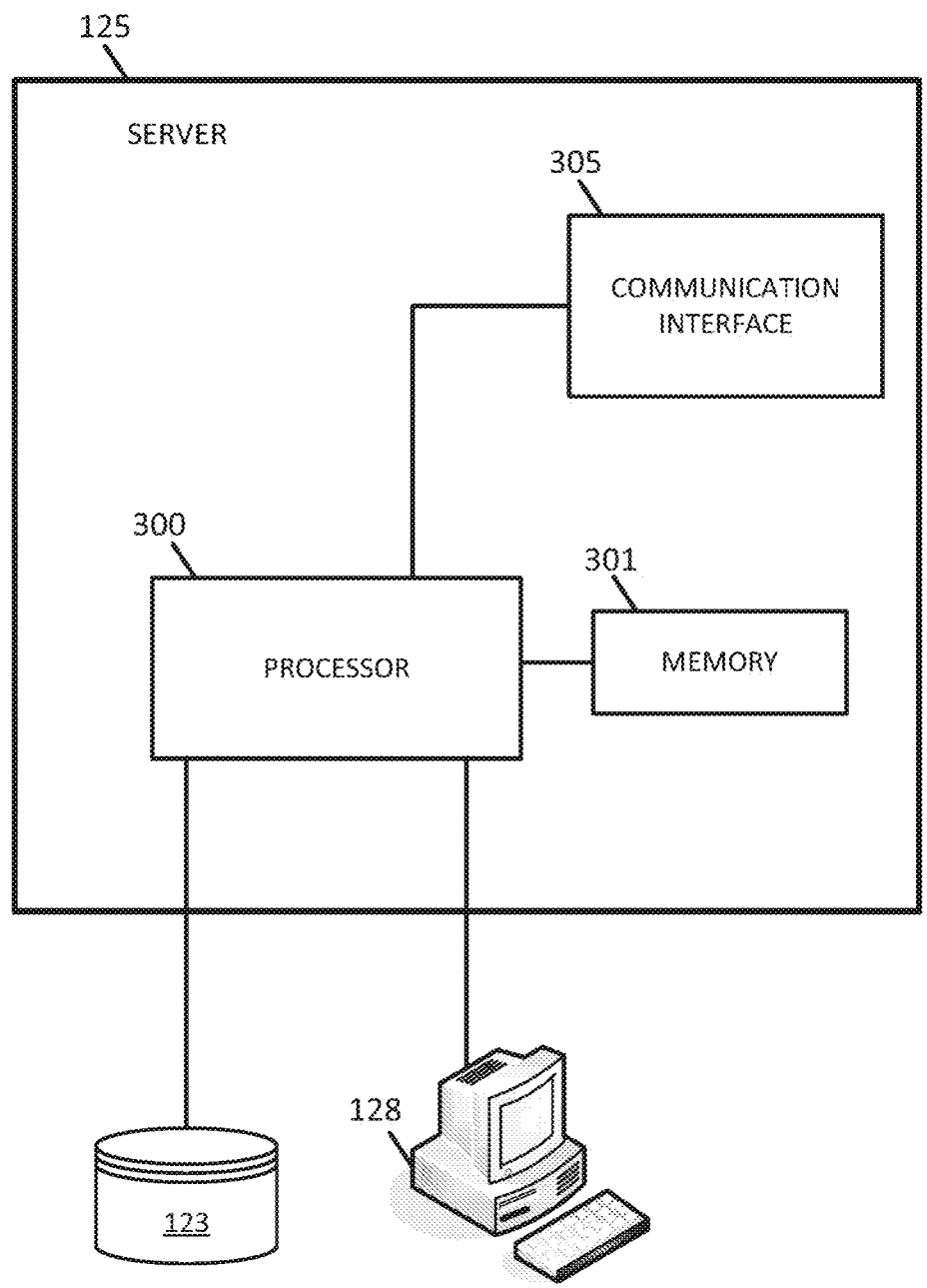
FIG. 14 illustrates an example server implementation of the lane feature controller.

FIG. 14 illustrates an example server implementation of the lane feature controller 121. FIG. 20 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. Additional, different, or fewer components may be provided in the server 125.

Figure 15:
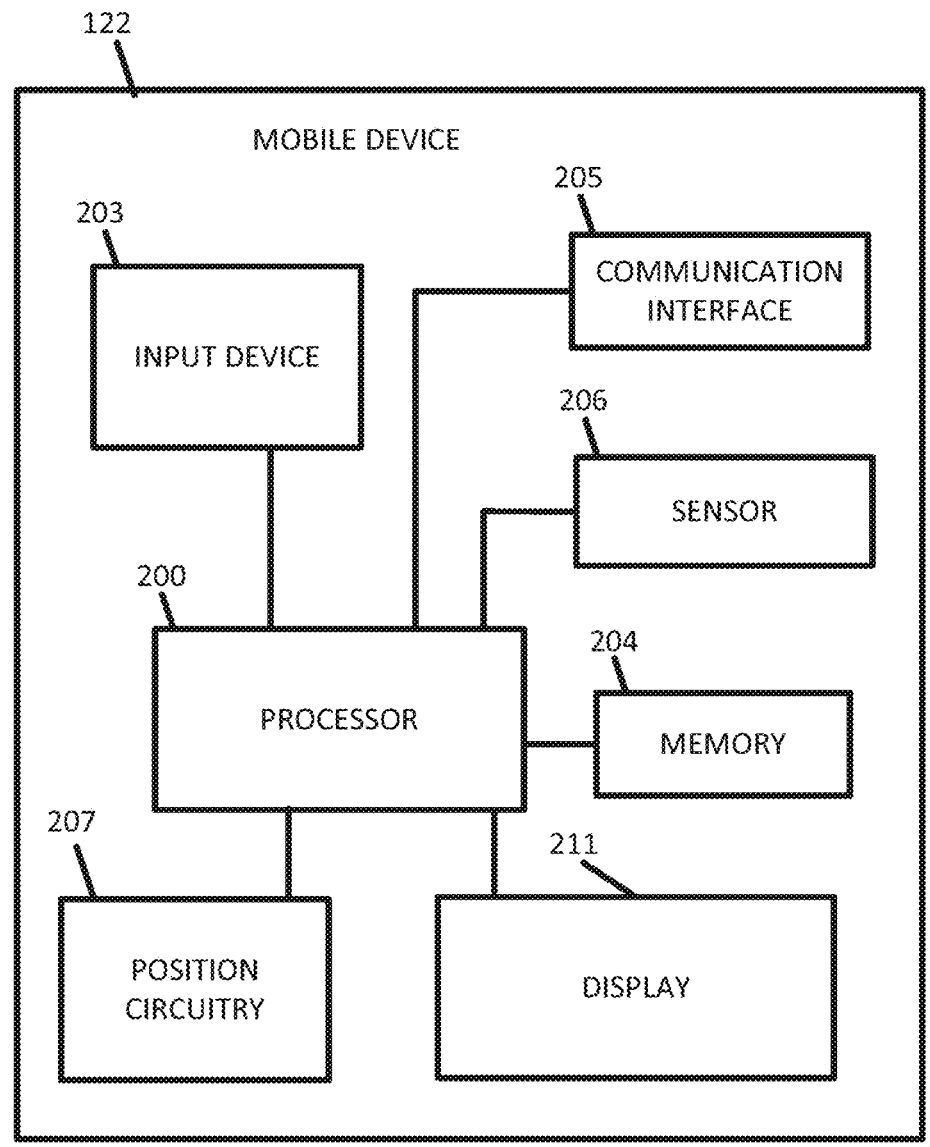
FIG. 15 illustrates an example mobile device implementation of the lane feature controller.

FIG. 15 illustrates an example mobile device implementation of the lane feature controller 121. FIG. 15 illustrates an exemplary mobile device 122 of the system of FIG. 1. The mobile device 122 includes a processor 200, a memory 204, an input device 203, a communication interface 205, position circuitry 207, a display 211, and a sensor 206. The sensor 206 may include a camera or another imaging device. The sensor 206 may include LiDAR or another distance based point cloud device. The input device 203 may receive commands from the user for default settings for the image classification techniques. The default settings may include the number of types of lane feature classifications, the identifiers of the classifications, the number of layers or other settings for the neural networks, the size of the predetermined lane geometry, an angle for rotation of the training images, whether or not the sliding window is used, and a gap size for the sliding window.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 16:
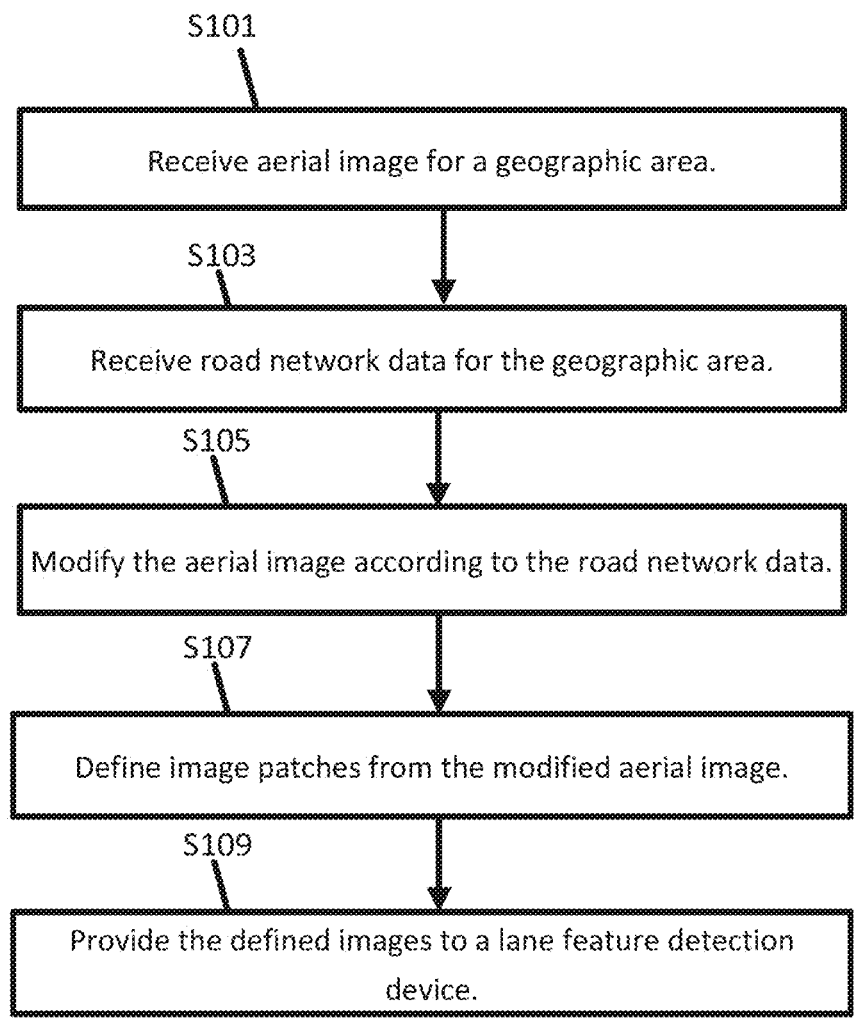
FIG. 16 illustrates an example flow chart for the operations of the server and/or the mobile device.

FIG. 16 illustrates an example flow chart for the operations of the server and/or the mobile device. Additional, different, or fewer acts may be provided. Either the mobile device 122 or the server 125 performs the acts of FIG. 16. The resulting lane feature classifications may be provided back to the mobile device 122 or other mobile devices 122 for the location based service.

At act S101, an aerial image for a geographic area is received. The aerial image may be received from an aerial vehicle that collected the aerial image. The aerial image may be received from a database or other memory where a set of aerial images are indexed according to geographic location. The communication interface 205 or the communication interface 305 are example means for receiving the aerial image.

At act S103, road network data for the geographic area is received. The road network data describes the locations of one or more roads or paths included in the geographic area that corresponds to the aerial image. The road network data may be accessed from the geographic database 123. The road network data may be detected in response to an analysis of probe data. The road network data may be registered with the aerial image. That is, one or more points in the aerial images are tied to points in the road network data so that the location of the roads or paths in the aerial image are identified from the road network data. The communication interface 205 or the communication interface 305 are example means for receiving the road network data.

At act S105, the aerial image is modified according to the road network data. The aerial images may be combined with a ground truth mask that is based on the road network data. Portions of the aerial image that correspond to the road network data may be retained. Portions of the aerial image that do not correspond to the road network data may be removed. As a result, the modified image may include only pixels that correspond to the road network data.

The processor 200 or the processor 300 may include modification module including an application specific module or processor that modifies the aerial image. The processor is an example means for modifying the aerial image.

At act S107, a set of images are defined from the modified aerial image. At act S109, the images are provided to the lane feature detection device, which may include a neural network. In one example, the images are training images and provided to the lane feature detection device for training. Thus, one or more parameters of the lane feature detection device are determined in response to an analysis of the pixel values in the images (e.g., locations of the lane features in the images). In one example, the images are collected images and provided to the lane feature detection device after it has been trained, or at least partially trained. The collected images are analyzed to determined where predicted lane features are located in the images.

The images may be patches divided from the modified aerial image. In one example, the images are tiles cut from a grid overlaid on the entire aerial image. In another example, the images are defined according to sections of roadway. That is, in the road network a predetermined length of road defines a length of the image patches. Alternatively, the length of the image patch may be defined according to a length of road that extends until the road turns by a predetermined angle. Alternatively, the length of the image patch may be defined according to a length of road that extends until the road meets another road. Alternatively, the length of the image patch may be defined according to a length of road that extends until the road experiences a change in road attribute such as speed limit, functional classification, number of lanes or another feature.

The processor 200 or the processor 300 may include an image patch module including an application specific module or processor defines the image patches. The processor is an example means for defining image patches from the modified aerial image. The processor 200 or the processor 300 may include lane feature module including an application specific module or processor that analyzes the image patches. The processor is an example means for providing the defined image to the lane feature module.

The lane feature controller 121 may modify the geographic database 123 to provide navigation applications, mapping applications, or driving applications in response to the detected lane features as described in more detail below.

Figure 17:
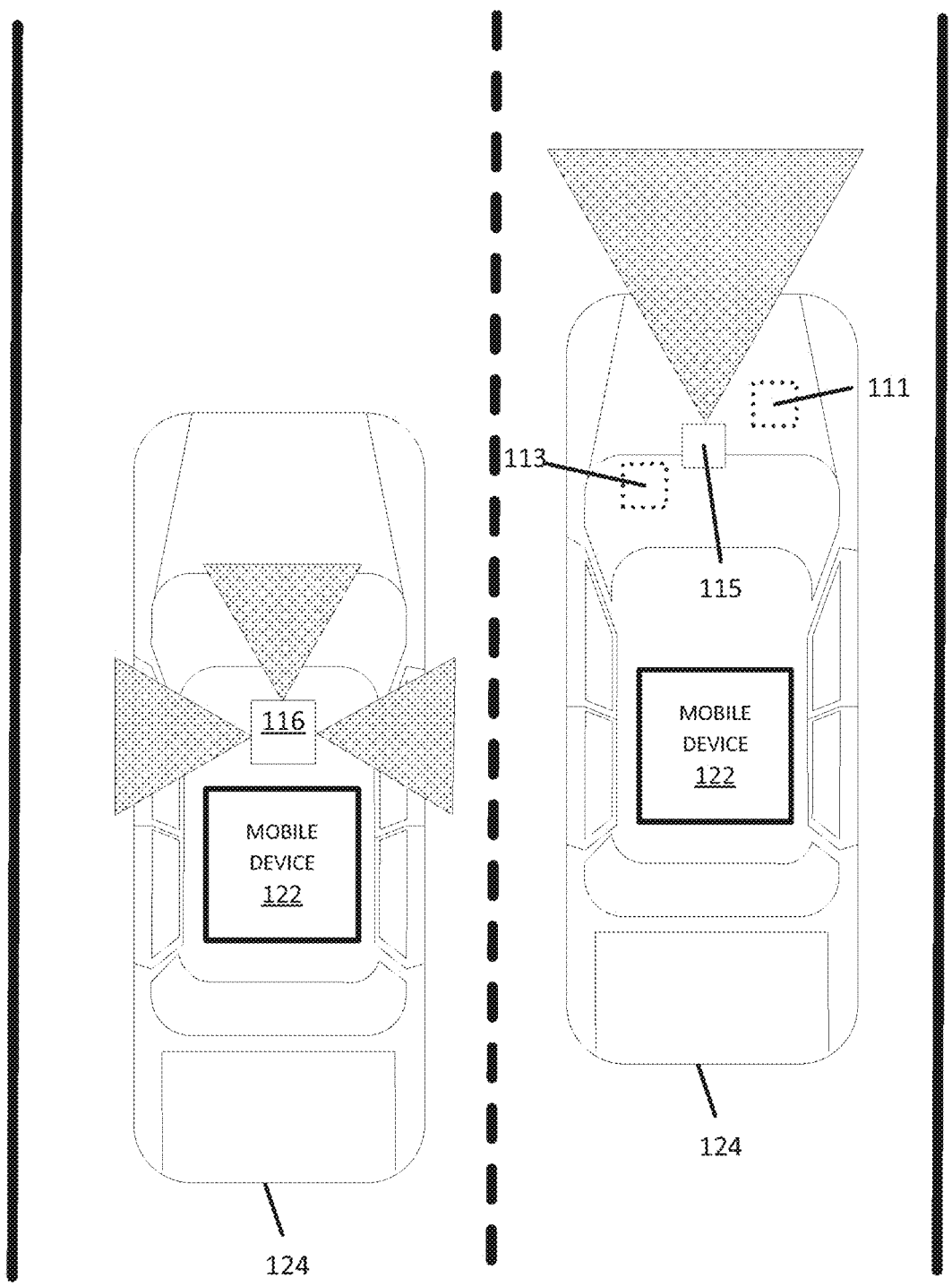
FIG. 17 illustrates exemplary vehicles of the systems of FIG. 1.
Figure 18:
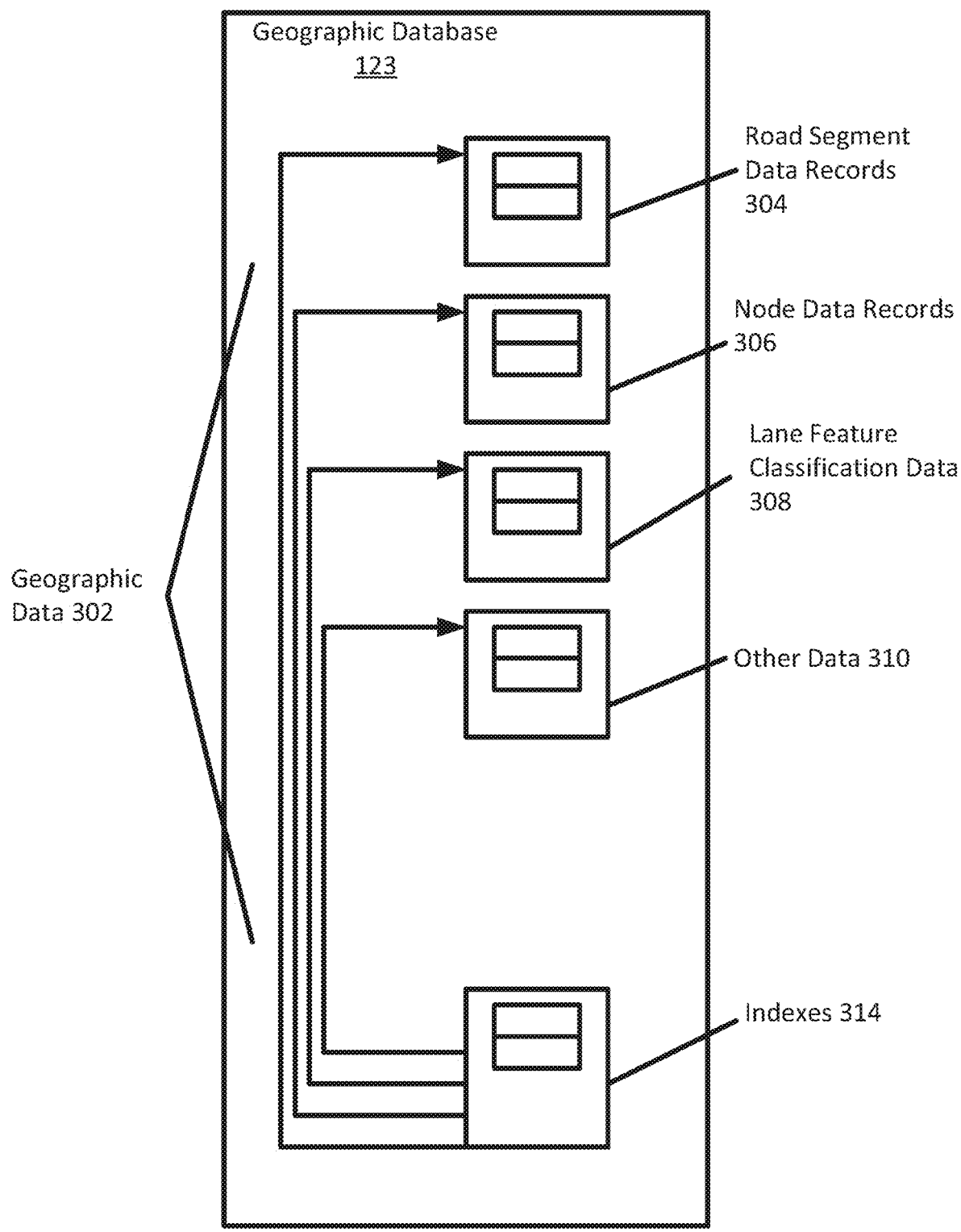
FIGS. 18 and 19 illustrate example geographic databases.
Figure 19:
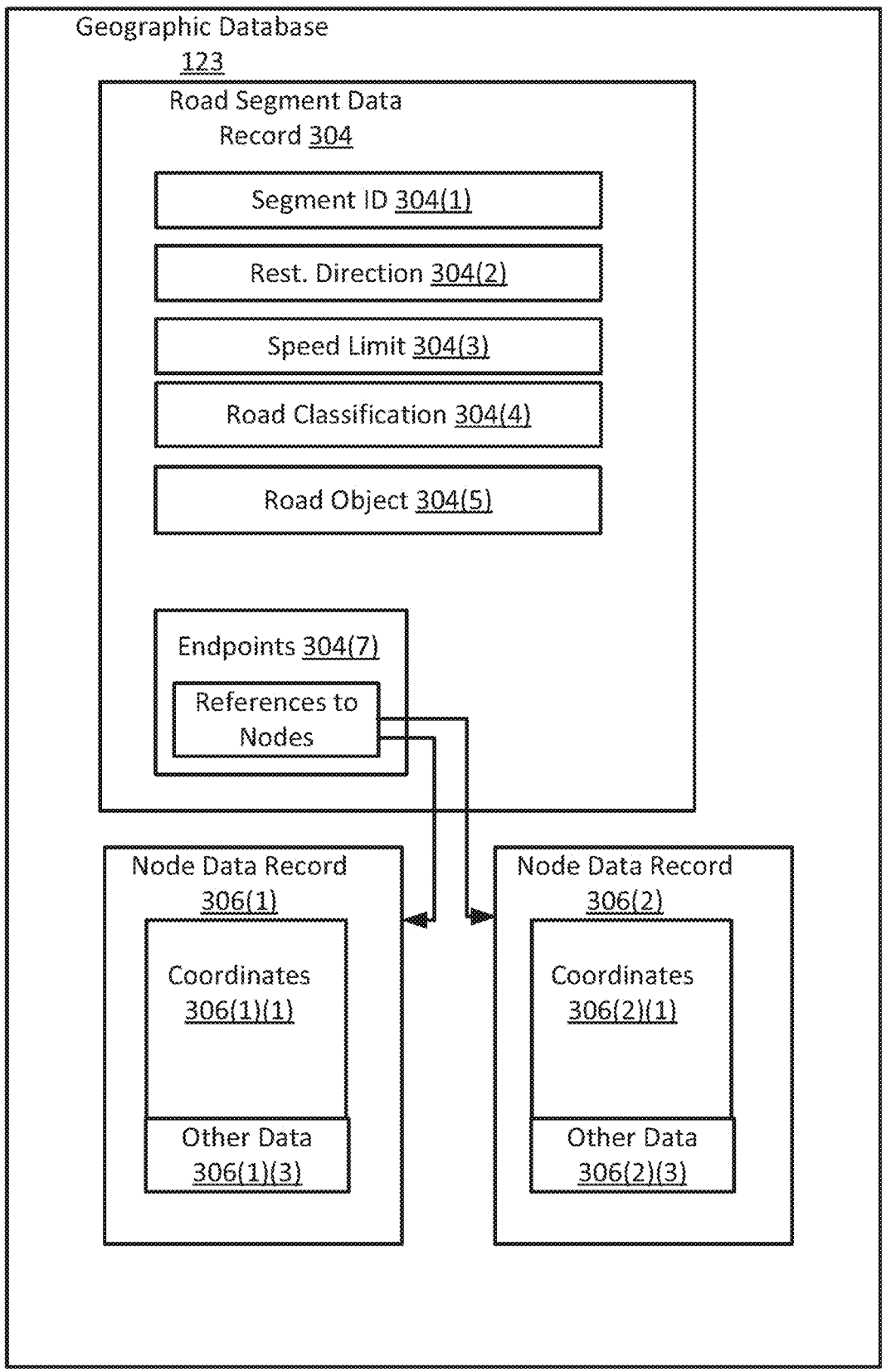

FIG. 17 illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the object classifications and other geographic data received from geographic database 123 and the server 125 to generate driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the detected lane features and/or other geographic data received from geographic database 123 and the server 125 to generate driving commands or navigation commands. For example, the may provide a driving command to the vehicle 124 based on the position of the lane feature. When the lane feature is lane boundary, the driving command may steer the vehicle within the lane boundary. When the lane feature is a lane divider, the driving command may identify a lane change in response to the lane feature.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode.

Other levels of automation are possible. The HAD vehicle may control the vehicle through steering or braking in response to the on the position of the vehicle and may respond to the lane feature classifications and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane feature classifications and other geographic data received from geographic database 123 and the server 125 to generate driving commands or navigation commands.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments, which may be determined based on the lane feature classifications (e.g., speed limit, direction of travel, turn restrictions, or other road attributes).

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

In FIG. 24, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate lane feature classification data 308 with a road segment in the segment data records 304 or a geographic coordinate. An index 314 may, for example, store lane feature classification data 308 relating to one or more objects that have been identified from the convolutional and deconvolutional neural network devices described herein.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

FIG. 25 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size.

The road objects may be objects in the road or in the vicinity of the road. The road objects may be stored with a classification field according to the object classifications calculated from the neural network pipeline. Example object classifications are provided in Table 1. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 25 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, the node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for lane feature detection from an image according to predetermined path geometry, the method comprising:
receiving an image including at least one path;
selecting map data corresponding to the at least one path, the map data defining the predetermined path geometry;
modifying the image according to the selected map data including the predetermined path geometry;
generating, using a processor, a lane feature prediction model based on the modified image; and
providing a subsequent image to the lane feature prediction model for a prediction of at least one lane feature.

Embodiment 2

The method of embodiment 1, further comprising:
generating a ground truth mask including the predetermined path geometry, wherein the image is modified according to the ground truth mask.

Embodiment 3

The method of embodiment 1 or 2, wherein the ground truth mask includes pixels of a first value for the predetermined path geometry and pixels of a second value for modified portions of the image.

Embodiment 4

The method of any of embodiments 1 to 3, further comprising:
accessing a width value for the at least one path from the map data, the predetermined path geometry having a dimension corresponding to the width value.

Embodiment 5

The method of any of embodiments 1 to 4, further comprising:
receiving probe data for the at least one path; and
analyzing the probe data to derive the width value.

Embodiment 6

The method of any of embodiments 1 to 5, further comprising:
performing an image processing algorithm on the image including the at least one path, wherein the image processing algorithm includes segmentation of a road surface or filtering of pixel values for a centerline for the at least one path, wherein the width value is derived from an output of the image processing algorithm.

Embodiment 7

The method of any of embodiments 1 to 6, further comprising:

accessing a centerline for the at least one path from the map data; and defining the predetermined path geometry based on a predetermined distance to the centerline.

Embodiment 8

The method of any of embodiments 1 to 7, wherein the predetermined distance is based on a number of lanes including in the at least one path or a functional classification of the at least one path.

Embodiment 9

The method of any of embodiments 1 to 8, further comprising:

dividing the modified image into a plurality of training images according to a patch size, wherein each of the plurality of training images includes at least a portion of the at least one path.

Embodiment 10

The method of any of embodiments 1 to 9, further comprising:

rotating at least one of the plurality of training images to a predetermined angle.

Embodiment 11

The method of any of embodiments 1 to 10, wherein the plurality of training images are spaced apart in a direction of the at least one path.

Embodiment 12

The method of any of embodiments 1 to 11, further comprising:

identifying a scaling factor for a relationship between pixel size in the image and geographic distance in the map data.

Embodiment 13

The method of any of embodiments 1 to 12, further comprising:

receiving a navigation request; and providing a navigation message including the prediction of at least one lane feature in response to the navigation request.

Embodiment 14

An apparatus, configured to perform and/or control the method of any of embodiments 1-13 or comprising means for performing and/or controlling any of embodiments 1-13.

Embodiment 15

An apparatus, comprising at least one processor and at least one memory including computer program code for one or more programs, the at least one memory and the computer program code configured to, with the at least one processor, to perform and/or control the method of any of embodiments 1-13.

Embodiment 16

A computer program comprising instructions operable to cause a processor to perform and/or control the method of any of embodiments 1-13, when the computer program is executed on the processor.

I claim:

1. A method for lane feature detection from an aerial image, the method comprising:
   receiving an aerial image including at least one road;
   generating a ground truth mask including at least one road geometry for the at least one road by accessing a width value for the at least one road from the map data, the at least one road geometry having a dimension corresponding to the width value;
   modifying the aerial image according to the ground truth mask;
   generating, using a processor, a lane feature prediction model based on the modified aerial image; and
   providing a subsequent aerial image to the lane feature prediction model for a prediction of at least one lane feature.

2. The method of claim 1, wherein the ground truth mask comprises mask values.

3. The method of claim 1, wherein the mask values include a first value for at least one portion of the aerial image that correspond to the at least one road and a second value for at least one portion of the aerial image other than the at least one road.

4. The method of claim 1, further comprising:
   receiving probe data for the at least one path; and
   analyzing the probe data to derive the width value.

5. The method of claim 1, further comprising:
   performing an aerial image processing algorithm on the aerial image including the at least one path, wherein the aerial image processing algorithm includes segmentation of a road surface or filtering of pixel values for a centerline for the at least one path,
   wherein the width value is derived from an output of the aerial image processing algorithm.

6. The method of claim 5, further comprising:
   accessing the centerline for the at least one path from the map data.

7. The method of claim 4, wherein the width is based on a number of lanes included in the at least one road or a functional classification of the at least one road.

8. The method of claim 1, further comprising:
   dividing the modified aerial image into a plurality of training aerial images according to a patch size, wherein each of the plurality of training aerial images includes at least a portion of the at least one path.

9. The method of claim 8, further comprising:
   rotating at least one of the plurality of training aerial images to a predetermined angle.

10. The method of claim 8, wherein the plurality of training aerial images are spaced apart in a direction of the at least one road.

11. The method of claim 1, further comprising:
identifying a scaling factor for a relationship between pixel size in the aerial image and geographic distance in the map data.

12. The method of claim 1, further comprising:
receiving a navigation request; and
providing a navigation message including the prediction of at least one lane feature in response to the navigation request.

13. An apparatus for lane feature detection from an aerial image according to predetermined path geometry, the apparatus comprising:
a controller configured to identify map data corresponding to at least one road having a geometry, access a width value for the at least one road from the map data, the at least one road geometry having a dimension corresponding to the width value, and generate a ground truth mask including for the at least one road;
an aerial image editor configured to modify the aerial image according to the ground truth mask and the geometry of the at least one road; and
a lane feature model trained according to the modified aerial image and configured to identify at least one lane feature from a subsequent aerial image.

14. The apparatus of claim 13, further comprising:
an aerial image trainer configured to identify a plurality of training patch aerial images from the modified aerial image.

15. The apparatus of claim 14, wherein the aerial image trainer is configured rotate at least one of the plurality of training patch aerial image to a predetermined angle.

16. The apparatus of claim 13, wherein the controller identifies a scaling factor to relate the map data and the aerial image, wherein the predetermined path geometry is sized according to the scaling factor.

17. The apparatus of claim 13, wherein the aerial image editor modifies the aerial image according to a ground truth mask.

18. The apparatus of claim 17, wherein the ground truth mask includes a first mask value for portions inside the predetermined path geometry and a second mask for portions outside the predetermined path geometry.

19. A non-transitory computer readable medium including instructions that when executed by a process are configured to perform:
receiving an aerial image including at least one road;
generating a ground truth mask including at least one road geometry for the at least one road and accessing a width value for the at least one road from the map data, the at least one road geometry having a dimension corresponding to the width value;
modifying the aerial image according to the ground truth mask;
generating, using a processor, a lane feature prediction model based on the modified aerial image; and
providing a subsequent aerial image to the lane feature prediction model for a prediction of at least one lane feature.

* * * * *